(12) United States Patent
Norman et al.

(10) Patent No.: US 6,687,813 B1
(45) Date of Patent: Feb. 3, 2004

(54) DATA PROCESSING SYSTEM AND METHOD FOR IMPLEMENTING ZERO OVERHEAD LOOPS USING A FIRST OR SECOND PREFIX INSTRUCTION FOR INITIATING CONDITIONAL JUMP OPERATIONS

(75) Inventors: Oded Norman, Pardesia (IL); Gilad Hazan, Rosh-Ha'ain (IL); Noam Benayahu, Ramat Gan (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/489,738

(22) Filed: Jan. 21, 2000

(30) Foreign Application Priority Data

Mar. 19, 1999 (EP) .............................................. 99105630

(51) Int. Cl.[7] .......................... G06F 15/00; G06F 7/38; G06F 9/00; G06F 9/44
(52) U.S. Cl. ...................... 712/241; 712/233; 712/234
(58) Field of Search ................................ 712/241, 233, 712/234

(56) References Cited

U.S. PATENT DOCUMENTS

| 4,097,920 A | 6/1978 | Ozga ......................... 364/200 |
| 4,974,155 A | * 11/1990 | Dulong et al. ............... 712/219 |
| 5,485,629 A | 1/1996 | Dulong ........................ 395/800 |
| 5,710,913 A | 1/1998 | Gupta et al. ................. 395/588 |
| 5,727,194 A | 3/1998 | Shridhar |
| 6,085,315 A | * 7/2000 | Fleck et al. .................. 712/241 |
| 6,145,076 A | * 11/2000 | Gabzdyl et al. ............. 712/241 |
| 6,418,527 B1 | * 7/2002 | Rozenshein et al. ........ 712/241 |

OTHER PUBLICATIONS

"The TMS320C30 Floating–Point Digital Signal Processor" by Panos Papamichalis and Ray Simar, Jr., IEEE Micro, (Dec. 8, 1988) No.6+index, New York, USA, pp. 13–29.

* cited by examiner

Primary Examiner—Jeffrey Gaffin
Assistant Examiner—Justin Knapp

(57) ABSTRACT

A data processing system has a pipelined architecture and looping capability that allows a sequence of instruction execution sets to be repeated N times. The data processing system has an internal memory module data arithmetic logic units, and a program sequencer for fetching instruction fetch sets, dispatching instructions out of a instruction execution set to the data arithmetic logic units, and controlling the execution of nested loops. The instruction execution set is a subset of the instruction fetch set. The instruction execution set that initiates the conditional jump operation has a prefix instruction for initiating the conditional jump operation.

11 Claims, 4 Drawing Sheets

DATA PROCESSING SYSTEM AND METHOD FOR IMPLEMENTING ZERO OVERHEAD LOOPS USING A FIRST OR SECOND PREFIX INSTRUCTION FOR INITIATING CONDITIONAL JUMP OPERATIONS

FIELD OF THE INVENTION

The present invention relates generally to a method and an apparatus for implementing zero overhead loops, and more particularly to a method and an apparatus for implementing zero overhead loops using a prefix word in data processing units having a pipelined architecture.

BACKGROUND OF THE INVENTION

Data processing units have a looping capability that allows a sequence of instructions (i.e.—loop code) to be repeated a predetermined number N of times by jumping from the last instruction of the loop code to the first instruction of the loop code, if the loop was iterated for less than N times. Data processing units having a pipelined architecture, execute an instruction in a number of steps, such as fetch, decode and execute. In this type of data processing unit the first instruction of the loop code can be fetched while the last instruction of the loop code, is executed.

Performing the conditional jump can be done by using special hardware which detects that the last instruction of the loop code is executed. Usually the special hardware included a plurality of registers, a subtraction unit (i.e.—decrementor) and a comparator, for detecting if when the loop was iterated N, N is usually stored within one of the plurality of registers.

Performing the conditional jump can also be done by adding a special bit to each instruction, this bit indicating that there is a need to perform the conditional jump. U.S. Pat. No. 5,727,194 of Shridhar describes a system and a method for implementing zero overhead loops, using a special bit. A disadvantage of this solution is a decrease in the code density. Furthermore, in many prior art instruction sets, it is not possible to dedicate a special bit in each instruction of a processors instruction set. Another solution is setting such a special bit in a subset of the instruction set, but such a solution is not practical. A further disadvantage of the method disclosed in U.S. Pat. No. 5,727,194 of Shridhar, was that it did not deal with nested loops, and especially nested loops where an inner loop and an outer loop ended at consecutive instructions.

The method disclosed in U.S. Pat. No. 5,727,194 required that the penultimate instruction of the loop code will have a bit which will initialize a conditional jump to the beginning of the loop code, thus there was a need to place at least two instructions between the end of two loop codes. If the bit was assigned to another instruction, there was still a need to have a plurality of instructions between the end of two loop codes.

BRIEF DESCRIPTION OF THE DRAWINGS

While the invention is pointed out with particularity in the appended claims, other features of the invention are disclosed by the following detailed description taken in conjunction with the accompanying drawings, in which:

DETAILED DESCRIPTION OF THE PREFERRED EMBODIMENTS

It should be noted that the particular terms and expressions employed and the particular structural and operational details disclosed in the detailed description and accompanying drawings are for illustrative purposes only and are not intended to in any way limit the scope of the invention as described in the appended claims.

Figure 1:
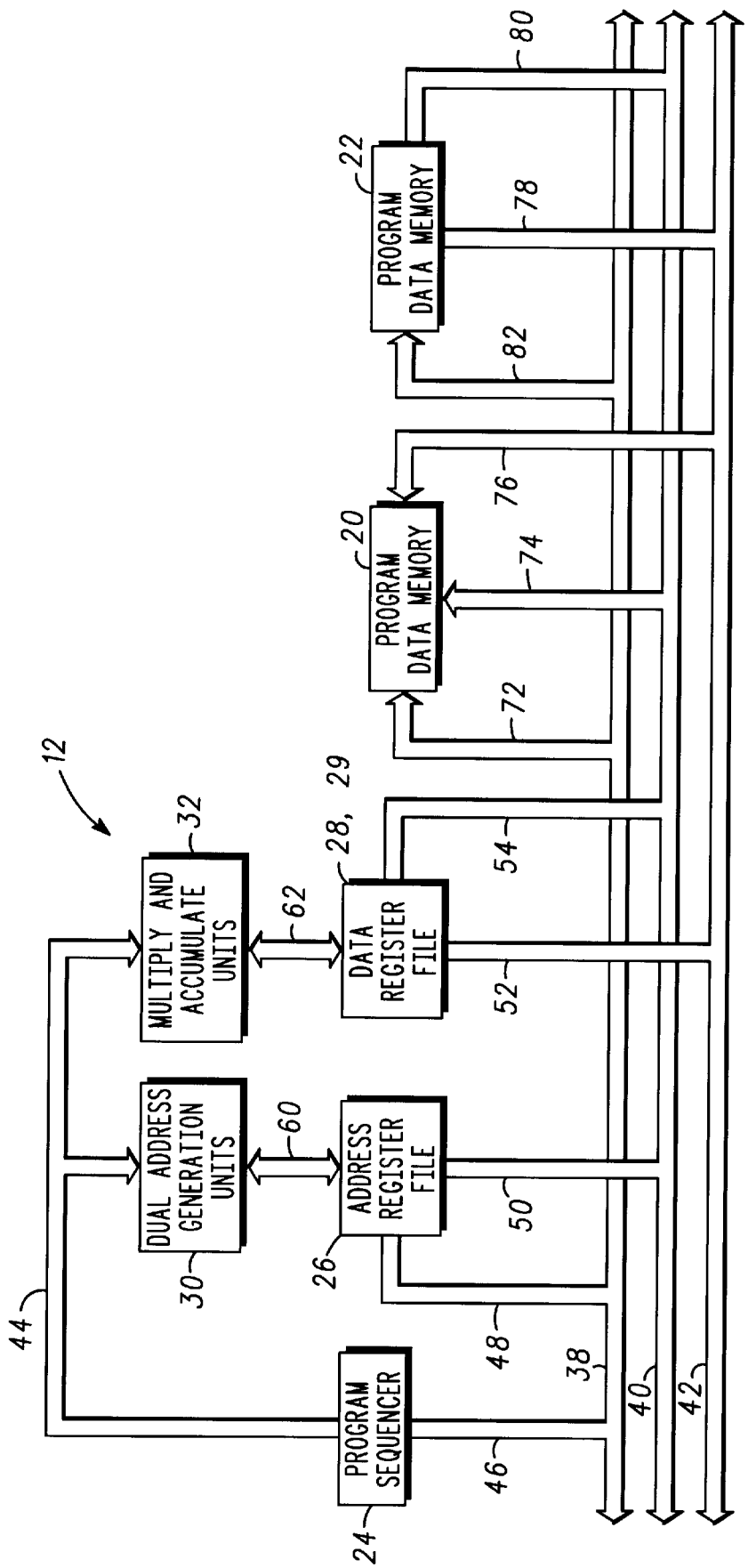
FIG. 1 is a block diagram of a data processing system, according to a preferred embodiment of the invention.

Referring to FIG. 1, an embodiment of a data processing system 10 is illustrated. The processing system 10 has a processor core 12 and internal memory modules 20, 22.

The processor core 12 has an address register file 26, a program sequencer 24, data register files 28, 29, address arithmetic logic units 30 (also referred to as address generation units (AGU)) and multiply and accumulate (MAC) units (32) (also referred to generally as data arithmetic logic units (DALU)). The address ALUs 30 are coupled to the address register file 26 via internal bus 60. The multiply and accumulate units 32 are coupled to the data register files 28, 29 via internal bus 62. The program sequencer 24 is coupled via the instruction bus 44 to the address ALUs 30 and the DALUs 32.

System 10 further includes a program bus 38, a first data bus 40, a second data bus 42, a peripheral bus 88 (not shown). The program bus 38 is coupled to the program sequencer 24 via bus 46, to internal memory 20, 22 via buses 72 and 82 respectively. The data buses 40, 42 are coupled to address register file 26 via buses 48, 50, and to data register files 28, 29 via buses 52, 54. The data buses 40, 42 are coupled to memory 20, 22 via buses 74–80.

In the illustrated embodiment, the program bus 38 is 128 bits wide, and the other buses 40 and 42 are 32 bits wide.

Figure 2:
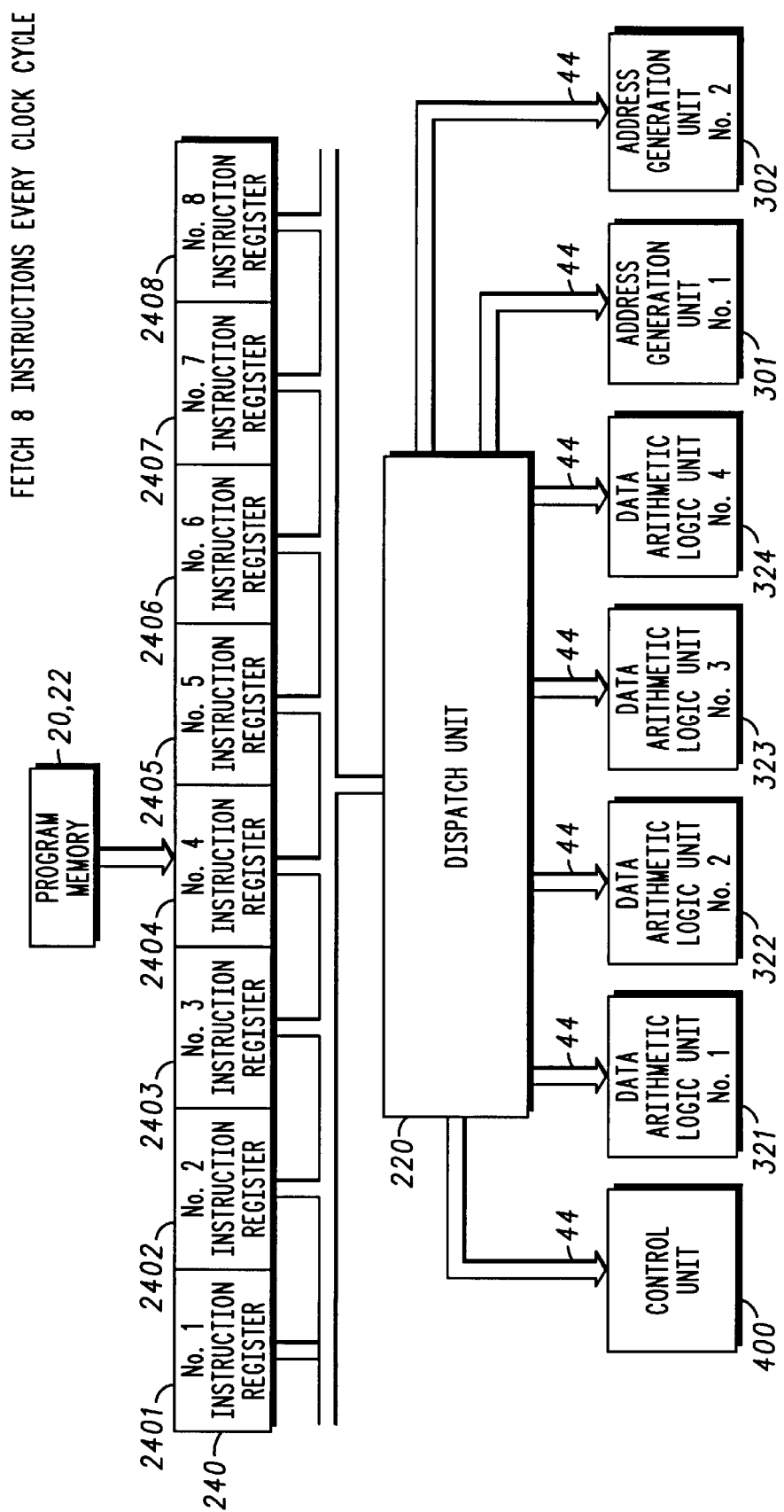
FIG. 2 is a diagram that illustrates a dispatch unit, and a dispatch operation for the core of the system of FIG. 1.

Referring to FIG. 2, illustrating a dispatch unit, and a dispatch operation for the core of the system of FIG. 1. Internal memory 20 and 22 store instruction fetch sets. Preferably, each instruction fetch set comprises of fixed number of instructions. An instruction execution set is usually a subset of an instruction fetch set, usually a single instruction fetch set is comprised of a single instruction execution set, but can also have instructions from other instruction execution sets. A instruction execution set comprises of a plurality of instructions which can be executed in parallel by the various execution units within system 10.

A loop code comprises of a plurality of loop instruction execution sets, wherein one of the loop instruction has a prefix instruction which initiates a conditional jump operation to the beginning of the loop code. The jump operation is performed while the loop was not iterated N times.

The embodiment illustrates a dispatch unit 220, eight instruction registers 2401–2409, collectively denoted 240, for storing eight instructions every clock cycle, a program memory (either program memory 20 or 22), various data arithmetic logic units (DALUs) 321–324 (collectively denoted 32 in FIG. 1), address generation units (AGUs) 301–302, 324 (collectively denoted 30 in FIG. 1), and control unit 400. The dispatch unit 220 and instructions registers 240 may form the program sequencer 24. In the illustrated embodiment, since there are six execution units, the maximum number of instructions that may be grouped in an execution set would be eight, including two prefix instructions. In the illustrated example, the first instruction, stored within the first instruction register 2401 is a prefix instruction. The prefix instruction is passed to control unit 400. The dispatch unit 220 groups the instructions into execution sets, whereas the prefix instruction is sent to control unit 400 and the other instructions of the execution instruction set are then simultaneously dispatched via a routing mechanism to the appropriate execution units 301–302, 321–324, for parallel decoding and execution. Simultaneous dispatch means that execution of each of the grouped instructions is initiated during a common clock cycle. In the illustrated embodiment of the system 10, execution of each of the grouped instructions is initiated during a common clock cycle, but one or more of the grouped instructions may complete execution during a different clock cycle.

Program sequencer 24 can comprise of an additional set of instruction registers, thus program sequencer 24 can store two instruction sets. When system 10 executes code fragments having two loop execution instruction sets, program sequencer 24 provides both loop execution instruction sets, thus reducing the number of fetch operations from program data memory 20, 22.

Figure 3:
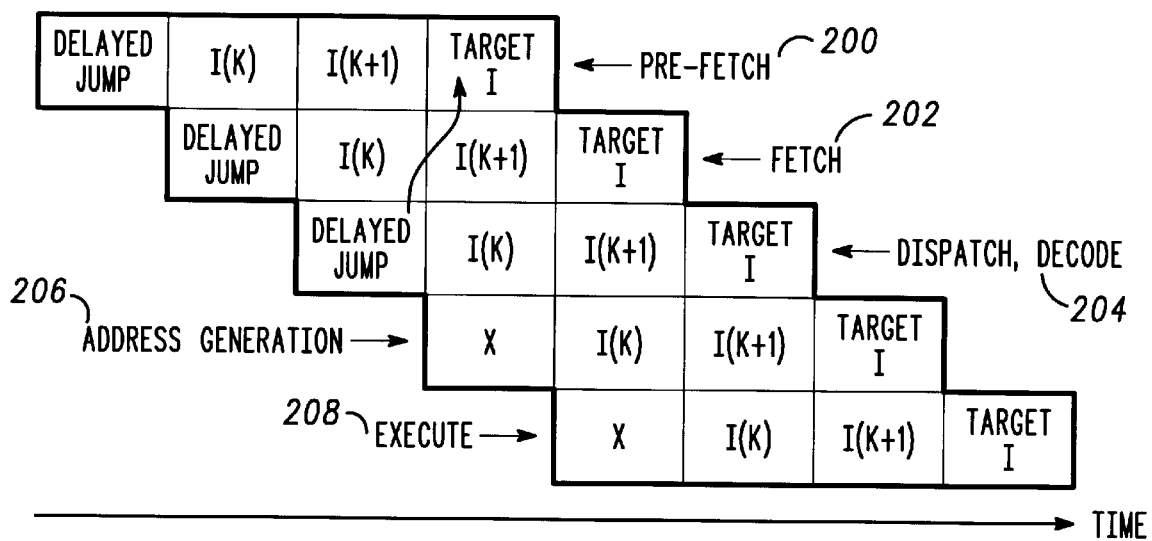
FIG. 3 is a schematic diagram of a nested loop control unit, according to a preferred embodiment of the invention.

FIG. 3 illustrates a pipeline execution method that is used with the system 10 of FIG. 1. The pipeline method includes the execution stages of program pre-fetch 200, program fetch 202, dispatch and decode 204, address generation 206, and execute 208.

The decoding of a jump or a delayed jump instruction causes a target instruction to prefetched in the next cycle. Thus, the target instruction is prefetched three cycles after the jump instruction is prefetched, and accordingly, the target instruction goes through the address generation and execution steps three cycles after the jump instruction goes through these steps.

In loop codes of K loop instruction execution sets, K>2, the pipeline architecture is utilized in an efficient manner by having a prefix instruction in the (K−2)'th instruction execution set. As further explained, the prefix instruction is a conditional delayed jump instruction. The delayed jump is delayed for two cycles, so that two additional instruction execution sets, I(K−1) and I(K) are executed, after the conditional jump operation is initiated.

The number of execution steps within a pipeline method, and especially the number of steps/cycles which differentiate between the initialization of the delayed jump operation and the execution of the target instruction limit the number of the additional instructions.

An example of an executable code fragment will have the following form:

| | | | |
|---|---|---|---|
| | doestup | _start | ; move the start address of the loop code to register SA. |
| | doen | LC | ; write N to loop counter LC register. |
| | skiploop | _end | ; skip loop (jmp to address_end) if LC =0. |
| _start | I(1) | | ; execute first instruction set of the loop code. |
| | I(2) | | |
| | . | | |
| | . | | |
| | . | | |
| | I(K-2), set first prefix bit | | ; execute instruction set I(K-2), which has a prefix instruction for performing a delayed jump operation to |

-continued

| | |
|---|---|
| I(K-1) | _start if LC>0, and LC=LC-1, ; execute an additional loop instruction execution set. |
| I(k) | ; execute a the last loop instruction set of the loop code. |
| _end. | |

The prefix word has a first field. For convenience of explanation the first field is referred to as first prefix bit. When the first prefix bit has a first value (i.e.—when the first prefix bit is set), nested loop control logic 300 checks whether the loop was iterated N times, if the answer is NO, it performs a delayed jump to the first loop instruction execution set of the loop code.

Figure 4:
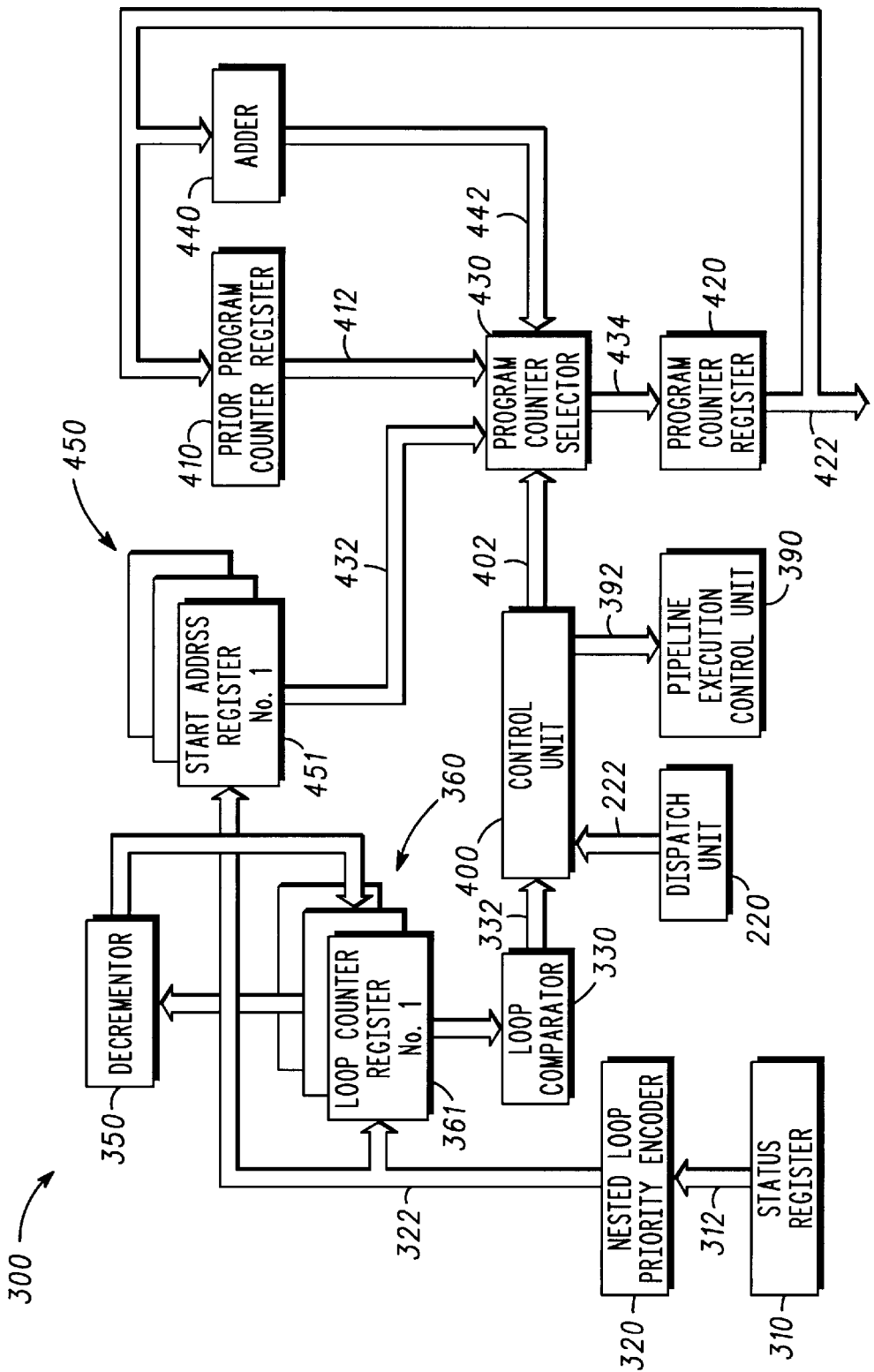
FIG. 4 is a pictorial illustration of a pipeline scheduling, according to a preferred embodiment of the invention.

Referring to FIG. 4, system 10 has a nested loop control logic 300 for supporting a plurality of nested loops. Nested loop control logic 300 is coupled to status register 310, dispatch unit 220 and pipeline execution control unit 390. Nested loop control logic 300 comprises of: a plurality of loop start address registers SA1–SA9 451–459, collectively denoted 450, for storing the addresses of the beginning of the plurality of loop codes; a plurality of loop counter registers LC1–LC9 361–369, collectively denoted 360, for storing a plurality of loop counters, indicating the number of times each loop code was repeated; a decrementor 350, coupled to the loop counter registers, whereas the decrementor 350 and the loop counter registers 360 count the number of times each loop code was repeated; a nested loop priority encoder 320, for receiving data regarding which loops are valid for and selecting the most valid inner loop; an LC comparator 330 for determining whether a loop was iterated N times; a program counter register 420, for storing the current program counter and outputting the current program counter to address register files 26; an adder 440, for incrementing the current program counter, a program counter selector 430 for selecting whether the next program counter is be provided by either one of the start address registers 450 or from adder 440. Usually the start address registers 450 provide the program counter when a loop code was repeated for less than N times ; a control unit 440, for receiving control signals from dispatch unit 220 and LC comparator 330, for determining the source of the next program counter, and for notifying pipeline execution control unit 390 if there is a need to perform a jump operation or a delayed jump operation. As indicated by the dashed lines, nested loop control logic 300 can also have a prior PC register 410 for saving the previous program counter. When system 10 executes a loop code having two loop execution instruction sets, prior PC register points to one of the instruction execution sets stored within program sequencer 24, and PC register stores the address of the second instruction executions set stored in program sequencer 24.

If system 10 executes a loop code having a single instruction execution set, PC selector 430 is disabled, and the value of the program counter register 420 is not updated. The prefix word can have a field for indicating whether a loop code has one, two or more loop instruction execution sets. Preferably, status register 310 has a control field which indicates whether a loop code is a short loop code—the loop code has one or two instruction execution sets, and if so—the first field and a second field within the prefix word indicate if the loop code has one or two instruction execution sets.

Status register 310 has a plurality of control fields, each control field indicates which loop is valid—which code loops were not repeated N times. Dispatch unit 220 sends to control unit 400 the prefix instructions. Pipeline execution control unit 390 controls the operation of the pipeline execution method within system 10.

Status register 310 is coupled to nested loop priority encoder 320 by bus 312. Nested loop priority encoder 320 is coupled to LC registers 360 by bus 322, and to SA registers 450 by bus 324. LC registers 360 are coupled to decrementor 350 by bus 362 and 352 and to LC comparator 330 by bus 364. Control unit 400 is coupled to dispatch unit 220 by bus 222, to LC comparator 330 by bus 332, to pipeline execution control unit 390 by bus 392 and to PC selector 430 by bus 402. PC selector 430 is coupled to SA registers 450 by bus 432, to adder 440 by bus 442, to PC register 430 by bus 434 and to prior PC register 410 by bus 412. PC register is coupled to adder 440 and to prior PC register 410 by bus 422. Nested loop priority encoder 320 detects the most inner valid loop, and enables the LC register and SA register associated to the most inner valid loop.

The control unit 220 has a logic circuit (not shown in FIG. 3) for handling consecutive prefix instructions. The logic circuit masks prefix instructions which are not associated to the loop which is currently executed. For example, if there are 5 nested loops, and five consecutive instruction sets contain five prefix instructions, each prefix instruction associated to one of the nested loops, the logic circuit for handling consecutive prefix instructions will mask the second to fifth prefix instruction while the first loop is executed, and will mask the third to fifth prefix instructions when the second loop is executed.

Control unit 400 receives the prefix instruction from dispatcher unit 220. If the prefix instruction is not masked by the logic circuit for handling consecutive prefix instructions, control unit 400 sends a signal to decrementor 350 and to the selected LC register, this signal causes the content of the selected LC register to be decreased. This decreased content is sent to LC comparator 330 for checking whether the loop was iterated N times, and if not so, control unit 400 sends a control signal to pipeline execution control unit 390, notifying it that there is a need to perform a delayed jump. Performing a jump operation involves sending PC selector 430 a signal causing it to select the start address of the selected loop, stored within the selected SA register.

A unique aspect of system 10 is the ability to perform nested loops in a very efficient manner by using two types of prefix fields.

An outer loop can be skipped when the last loop instruction execution set of an outer loop, is located near the last loop instruction execution set of an inner loop, and the loop instruction execution set which sets the first prefix bit of the outer loop is located between the loop instruction execution set which sets the first prefix bit of the inner loop and the last loop instruction execution set of the inner loop. For example, if the (K−2)'th loop instruction execution set of the outer loop sets the first prefix bit of the outer loop and the (K−2)'th loop instruction execution set is the last or the penultimate loop instruction execution set of the inner loop. Thus, when the execution of the inner loop ends, the loop instruction execution set which sets the first prefix bit of the outer loop is skipped, and the outer loop is not repeated.

System 10 solves the problem by using a second field within the prefix instruction. For convenience of explanation the second field is referred to as second prefix bit. When the second prefix bit has a first value (i.e.—the second prefix bit is set), the nested loop control logic checks whether the loop was iterated N times, if the answer is NO, it performs a jump to the start of the loop code. This second prefix bit is set in the last loop instruction execution set of the outer loop code. The second field causes control unit 400 to send pipeline execution control unit to perform a non delayed jump operation. Control unit 220 has a logic circuit (not shown in FIG. 3) for handling first and second prefix fields associated to a single loop. This logic circuit masks a second prefix field associated to a loop, if the loop instruction set which set the first prefix field was executed. Thus is N delayed jump operation were initiated by setting the first prefix bit, there will not be an additional jump operation, initialized by the second prefix bit. Preferably, this logic circuit also handles consecutive prefix instructions.

The two prefix bits can be used wherever there are two nested loops. An example of a portion of an executable code fragment having three nested loop and using the two prefix bits has the following form, wherein the first code loop (the most external loop code) has K1 instruction execution sets, the second loop code (the intermediate loop code) has K2 instruction execution sets and the third loop code (the most inner loop code) has K3 instruction execution sets. The first loop code is comprised of K2 instruction execution sets of the intermediate loop code, K3 instruction execution sets of the inner loop code and additional M1 instruction execution sets. The intermediate is comprised of K2 instruction execution sets and additional M2 instruction execution sets.

| | | |
|---|---|---|
| _start1 | I1(1) | ; execute first loop instruction execution set of the first loop code. |
| | . | |
| | I1(M1-1) | ; execute (MI-1)'th loop instruction execution set of the first loop code. |
| _start2 | I2(1) | ; execute first loop execution instruction set of the second loop code. |
| | . | |
| | I2(M2-1) | execute (M2-1)'th loop instruction execution set of the second loop code. |
| _start3 | I3(1) | ; execute first loop instruction execution set of the third loop code. |
| | I3(K3-2), set first prefix bit of third loop | ; execute (K3-2)'th instruction execution set of third loop and perform a delayed jump to_start3 if LC3>0, LC3=LC3-1. |
| | I3(K3-1), set first prefix bit of second loop | ; execute the (K-1)'th instruction execution set of the third loop code. If LC3>0 ignore prefix word, else perform a delayed jump to _start2 if LC2>0, LC2=LC2-1. |
| _end1 | I3(K3), set first prefix bit of first loop | ; execute the last loop instruction execution set of the third loop. If LC2>0 ignore prefix word, else perform a delayed jump to _start1 if LC1>0, LC1=LC1-1. |
| _end2 | I2(K2), set second prefix bit of second loop | if a delayed jump to _start2 was performed, ignore second prefix bit, else perform a non delayed jump to _start2 if LC2>0, LC2=LC2-1. |
| _end3 | I3(K3), set second prefix bit of first loop | if a delayed jump to _start1 was performed, ignore second prefix bit, else, perform a non delayed jump to _start1 if LC1>0, LC1=LC1-1. |

The operation of system 10, and especially the execution of a loop is further explained by an example of an executable code fragment and the various execution stages (prefetch, fetch, decode, address, execute) involved in the execution of the mentioned above code fragment.

The code fragment has the following form:

| | | |
|---|---|---|
| doestup1 | _start1 | ; move the start address of the external loop code to register SA1. |
| Doen1 | N1 | ; write N1 to first loop counter LC1 register, set LC1. |
| doestup2 | _start2 | ; move the start address of the internal |

-continued

| | | |
|---|---|---|
| | | loop code to register SA2. |
| Doen2 | N2 | ; write N2 to first loop counter LC2 register, set LC2. |
| skiploop1 | _end1 | ; skip loop1 (jump to address_end1) if LC1=0. |
| _start1 | I1(1) | ; execute first loop instruction execution set of the external loop code. |
| | I1(2) | ; execute second loop instruction execution set of the external loop code. |
| | I1(3) | ; execute third loop instruction execution set of the external loop code. |
| . | | |
| | I1(M1-2) | ; execute (M1-2)'th loop instruction execution set of the external loop code. |
| | I1(M1-1) | ; execute (M1-1)'th loop instruction execution set of the external loop code. |
| _start2 | I2(1) | ; execute first loop instruction execution set of the inner loop code. |
| | I2(2) | ; execute second loop instruction execution set of the inner loop code. |
| . | | |
| | I2(M2-2), set first prefix bit of internal loop | ; execute I2(M2-2) and perform a delayed jump to _start2 if LC2>0, LC2=LC2-1. |
| | I2(M2-1), set first prefix bit of external loop | ; execute an additional loop instruction execution set of the internal loop code. If LC2>0 ignore prefix word, else perform a delayed jump to _start1 if LC1>0, LC1=LC1-1. |
| _end1 | I(K2) | ; execute the last loop instruction execution set I(K2) of the internal loop. |
| _end2 | I1(K1) set second prefix bit | ; if a delayed jump to _start1 was performed, ignore second prefix bit, of external loop else, perform a non delayed jump to _start1 if LC1>0, LC1=LCI-1. |

Table 1 shows the various execution stages (prefetch, fetch, decode, address, execute) involved in the execution of the mentioned above code fragment, and the response of system 10 to the prefix instructions

TABLE 1

| cycle | prefetch, fetch, decode, address, execute, | response to prefix bit |
|---|---|---|
| 1 | I1(1) | |
| 2 | I1(2) I1(1) | |
| 3 | I1(3) I1(2) I1(1) | |
| . | | |
| M1-1 | I1(M1-1) I1(M1-2) I1(M1-3) I1(M1-4) I1(M1-5) | |
| M1 | I2(1)  I1(M1-1) I1(M1-2) I1(M1-3) I1(M1-4) | |
| . | | |
| K1-3 | I2(K2) I2(K2-1) I2(K2-2) I2(K2-3) I2(K2-4) | LC2>0, LC2=LC2-1. Initialize delayed jump to _start2 |
| K1-2 | I2(1) I2(K2) I2(K2-1) I2(K2-2) I2(K2-3) | ignore prefix inst. of outer loop. |
| K1-1 | I2(2) I2(1) I2(K2) I2(K2-1) I2(K2-2) | |
| . | | |
| M1+K2*N2-3 | I2(K2) I2(K2-1) I2(K2-2) I2(K2-3) I2(K2-4) | LC2=0 |
| M1+K2*N2-2 | I1(1) I2(K2) I2(K2-1) I2(K2-2) I2(K2-3) | LC1>0, LC1=LCI-1, Initialize delayed jump to _start1 |
| M1+K2*N2-1 | I1(2) I1(2) I2(K2) I2(K2-1) | I2(K2-2) |
| M1+K2*N2 | I1(3) I1(2) I1(1) I2(K2) I2(K2-1). | |

If there is no need to perform the inner loop, the outer loop is repeated due to the presence of the second prefix word at address_end2. When there is no need to execute the inner loop, the inner loop is considered not valid.

TABLE 2

| cycle | prefetch, fetch, decode, address, execute, | response to prefix bit |
|---|---|---|
| 1 | I1(1) | |
| 2 | I1(2) I1(1) | |
| 3 | I1(3) I1(2) I1(1) | |
| . | | |
| M1-1 | I1(M1-1) I1(M1-2) I1(M1-3) I1(M1-4) I1(M1-5) | |
| M1 | I1(M1) I1(M1-1) I1(M1-2) I1(M1-3) I1(M1-4) | |
| M1+2 | I1(M1+1) I1(M1) I1(M1-1) I1(M1-2) I1(M1-3) | |
| M1+2 | I1(M1+2) I1(M1+1) I1(M1) I1(M1-1) I1(M1-2) | LC1>0, LC1=LC1-1 jump to _start1. |
| M1+3 | I1(1)  I1(M1+2)*I1(M1+1)* — — | |

I1(M1+1), I1(M1+2) are the instruction execution set which follow the outer loop. When a jump operation occurs, they are ignored.

Thus, there has been described herein an embodiment including at least one preferred embodiment of an improved method and apparatus for implementing zero overhead loops. It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

What is claimed is:

1. A data processing system having a pipelined architecture and having looping capability that allows a sequence of instruction execution sets to be repeated N times, the repetition involves a first delayed conditional jump operation to the first instruction execution set of the sequence of the instruction sets, the data processing system comprising:

an internal memory module, for storing a plurality of instruction fetch sets; data arithmetic logic units, wherein the data arithmetic logic units have the ability to work in parallel;

a program sequencer, coupled to the data arithmetic logic units and to the internal memory module, for fetching instruction fetch sets, for dispatching instructions out of an instruction execution set to the data arithmetic logic units, and for controlling the execution of nested loops; wherein the instruction execution set is a subset of the instruction fetch set; and wherein the first instruction execution set that initiated the first delayed conditional jump operation has a first prefix instruction, for initiating the first delayed conditional jump operation and a second instruction execution set of the sequence of instruction execution sets scheduled after the first instruction execution set and before the first delayed conditional jump operation comprises a second prefix instruction initiating a second delayed conditional jump operation performed only when the first conditional jump operation is not performed.

2. The data processing system of claim 1 wherein the first prefix instruction has two fields; wherein a first field indicates whether to initiate a conditional delayed jump operation and a second field indicates whether to initiate a non-delayed jump operation.

3. The data processing system of claim 2 wherein the program sequencer comprises:

a dispatch unit, for dispatching instructions to the data arithmetic logic units;

a pipeline execution control unit, for controlling the pipeline execution stages of data processing system;

a status register, for indicating which loops are valid;

a nested loop control unit, coupled to the internal memory module, to the dispatch unit, to the status register and to the pipeline execution control unit, for controlling the execution of nested loops; and wherein the nested loop control unit executes an instruction execution set sequence of the most inner valid loop, and upon reception of a prefix word which is associated to the most inner valid loop, the nested loop control unit initiates a jump operation to the first instruction execution set of the instruction execution set sequence.

4. The data processing system of claim 3 wherein the nested loop control unit comprises:

a plurality of loop start address registers, for storing the addresses of the first instruction execution sets of a plurality of code fragments;

a plurality of loop counter registers, for storing a value which indicates the number of times a plurality of loops were iterated;

a nested loop priority encoder, coupled to the plurality of loop start address registers, to the plurality of loop counter registers and to the status register, for selecting the most inner loop out of the plurality of valid loops, and for enabling a selected loop start address register and a selected loop counter register, the selected loop start address register and the selected loop counter register are associated with the selected loop;

a LC comparator, coupled to the plurality of loop count registers, for detecting whether the selected loop was iterated N times;

a decrementor, coupled to the plurality of loop count registers, for decrementing the value stored within the selected loop counter register each time the loop is iterated;

a program counter register, for storing the program counter;

an adder, coupled to the program counter register, for incrementing the content of the program counter register;

a PC selector, coupled to the adder, to the program counter register, to the plurality of loop start address registers, for selecting whether the next program counter is provided by either one of the selected loop start address registers and the adder; and a control unit, coupled to the dispatch unit, to the pipeline execution control unit, to the LC comparator, to the PC selector, for receiving a prefix instruction from the dispatch unit, receiving control signals from the LC comparator, and accordingly to determine the source of the next program counter and to determine whether there is a need to perform either one of a delayed jump operation and a jump operation.

5. The data processing system of claim 4 wherein the control unit comprises:

a logic circuit for handling consecutive prefix instructions and masking prefix instructions which are not associated to the selected loop.

6. The data processing system of claim 2 wherein the second prefix field is set in the last instruction execution set of an outer code loop.

7. A method for allowing a data processing unit to repeat a sequence of instruction execution sets to be repeated N times, the data processor having a pipelined architecture, at least one data arithmetic unit and a program sequencer, the method comprising the following steps:

fetching instruction fetch sets, the instruction fetch sets having at least one instruction to be executed by at least one data arithmetic unit;

dispatching each instruction out of a first instruction execution set to an appropriated data arithmetic unit, wherein if the first instruction execution set has a first prefix instruction, dispatching the first prefix instruction to the program sequencer; wherein the first instruction execution set is a subset of the instruction fetch set; and executing each instruction by the appropriate data arithmetic units, wherein if the first instruction execution set comprises the first prefix instruction, determining whether a loop was iterated N times, and if the loop was not iterated N times initiating a first delayed jump operation to a first instruction execution set of the sequence of instruction execution sets, and if a second instruction execution set of the sequence of instruction execution sets scheduled after the first instruction execution set and before the first delayed jump operation comprises a second prefix instruction initiating a second delayed jump operation performing the second delayed jump operation only when the first delayed jump operation is not performed.

8. The method of claim 7 wherein if there are at least two valid loops, executing the most inner valid loop.

9. The method of claim 8 wherein the first prefix instruction has two fields; and wherein a first field is set when there is a need to initiate a conditional delayed jump operation and a second field is set when there is a need to initiate a non-delayed jump operation.

10. A processor readable medium containing a first instruction set comprising at least one instruction to be executed by at least one data arithmetic unit of a data processing system; and wherein when a sequence of instruction sets is to be repeated N times, the instruction set further comprises a first prefix instruction, for initiating a first delayed conditional jump operation to the first instruction set of the sequence of instruction sets, the sequence of instruction sets further comprising a second instruction execution set scheduled after the first instruction set and before the first delayed conditional jump operation comprises a second prefix instruction for initiating a second delayed conditional jump operation only when the first delayed conditional jump operation is not performed.

11. The processor readable medium of claim 10 wherein the prefix instruction has two fields; and wherein a first field indicates whether to initiate a conditional delayed jump operation and a second field indicates whether to initiate a non-delayed jump operation.

* * * * *